Nov. 30, 1926.                    C. T. PFLUEGER                    1,608,953
                                   FISH STRINGER
                                Filed August 13, 1923

Inventor
CHARLES T. PFLUEGER.

By
Attorney

Patented Nov. 30, 1926.

1,608,953

UNITED STATES PATENT OFFICE.

CHARLES T. PFLUEGER, OF AKRON, OHIO, ASSIGNOR TO THE ENTERPRISE MANUFACTURING COMPANY, OF AKRON, OHIO, A CORPORATION OF OHIO.

FISH STRINGER.

Application filed August 13, 1923. Serial No. 657,066.

This invention relates to fish stringers and has for a general object the provision of a novel device on which a string of fish may be handily carried and from which they can be easily removed.

In the use of a fish stringer of the conventional type, it has been necessary to remove the fish from the same end of the string at which they are put on. Great difficulty and inconvenience has been experienced in this operation, due largely to the manner in which the fish are customarily strung, the string generally being passed under the gills in such a manner as to cause the fish to hang sidewise with respect to the string, and consequently any attempt to remove them at the receiving end of the string results in a binding of the string around the fish in a manner well known to fishermen and those skilled in this art.

It is an object of this invention, therefore, to overcome the objection referred to and to provide a device having means at one end for readily penetrating the fish to facilitate the stringing operation and constructed at the opposite end with a member for normally retaining the fish on the string, but which may be so positioned as to allow the ready removal of the fish therefrom when desired.

These and other features of the invention will appear more fully from the following detailed description when read in connection with the accompanying drawings and will be pointed out in the appended claims.

Figure 1:
Figure 1 is a plan view of the assembled fish stringer selected to illustrate the invention.

Referring to the drawings, 2 designates the cord which constitutes the major portion of the improved stringer. On one end of the cord is provided a needle 4 having upon its inner end an enlarged head 6. The needle is secured to the cord by a cylindrical metallic sleeve 8 of brass, or other non-corrosive material, the sleeve being provided with a central bore 10 of substantially the same diameter as the cord 2 in order to snugly receive the latter therein. The sleeve is attached to the cord in any suitable manner, one convenient and efficient method being by the formation of inwardly extending teeth 12 punched from the body of the sleeve. The central bore 10 is reduced in diameter at the outer end, as at 14, to form an internal shoulder 16 which cooperates by engagement with the head 6 to retain the needle within the sleeve.

Figure 2:
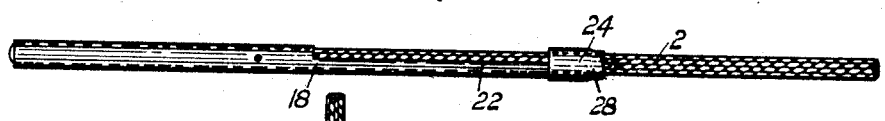
Figure 2 is a detailed view of the retaining member in position assumed to remove the fish.
Figure 3:
Figure 3 is a view of the retaining member in normal or open position.
Figure 4:
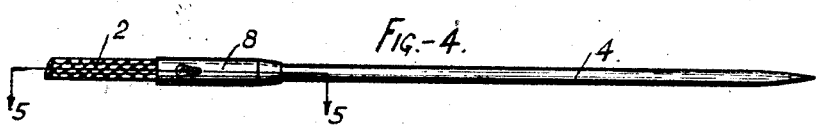
Figure 4 is a detail of the needle.
Figure 5:
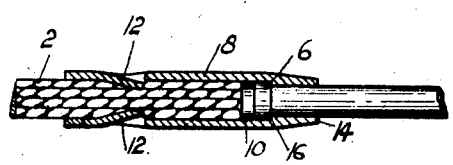
Figure 5 is an enlarged section on line 5—5 of Figure 4.

The opposite end of the cord 2 extends within a cylindrical member 18 which has been cut away for one-half of its length, as at 20, to provide a channel-shaped portion 22 adapted to receive the cord 2 therein in the manner disclosed in Figure 2. The member 18 serves as a retainer or holder for the fish and in the normal use of the stringer is positioned at right angles to the cord, as shown clearly in Figure 3, and acts as an abutment to hold the fish on the cord.

When it is desired to remove the fish from the stringer, the retaining member 18 is positioned, to form, in effect, a continuation of the cord so that the fish may be readily pulled thereover. In the removal position, Figure 2, the cord is pulled into the channel portion 22 of the holder and retained therein by means of a sleeve 24 having a central bore to receive the cord and adapted to slide over the beveled end 26 of the holder. The inner end of the sleeve 24 is provided with a beveled surface 28 to facilitate the removal of the fish over the inner end of the holder.

While the invention has been described as a fish stringer, it will be readily appreciated that it is equally adapted to use for the stringing of other objects, and the language of the claims will therefore be understood and construed accordingly.

Various changes may be made in the form, construction and arrangement of parts without departing from the spirit or scope of the invention, or sacrificing any of its material advantages, the form herein illustrated being merely the preferred embodiment thereof.

Having described my invention, what I claim as new and desire to secure by Letters Patent of the United States is:

1. As an article of manufacture, a fish stringer comprising a flexible body for retaining the fish, means on said body for piercing the fish, means for holding the fish on said body, said latter means including a member normally at right angles to the body and being shiftable to form a continuation of said body, and means on the body for retaining the holding means in shifted position by engagement with one end thereof.

2. As an article of manufacture, a fish stringer comprising a flexible body portion, a piercing element, means for connecting said element to one end of the body portion, a holder at the other end of the body, said holder comprising a cylindrical portion permanently secured to said body, a channeled portion adapted to receive said body portion, and means shiftable on the body for retaining said body portion within the channel.

3. As an article of manufacture, a fish stringer comprising a flexible cord, a needle for piercing the fish, means for securing the needle to one end of the cord, a holder to retain the fish on the cord, and means to retain positively said holder parallel to said cord to allow the removal of the fish thereover, said means being shiftable on the cord into engagement with one end of the holder.

4. As an article of manufacture, a fish stringer comprising a flexible cord, a needle secured to one end of said cord, a holder normally perpendicular to said cord, said holder having oppositely extending legs, means to permanently secure the cord to the holder and midway thereof, the said holder being shiftable into parallel relation with said cord end adapted to form a continuation of the cord, and separate means to retain positively the holder in shifted position.

5. A fish stringer, comprising a cord and a holder at one end of the cord in the form of a hollow stem in which the cord is permanently secured, a channeled portion adapted to receive the cord, and a thimble movable over the cord and in position to embrace the end of the channeled portion.

CHARLES T. PFLUEGER.